United States Patent
Henikl et al.

(10) Patent No.: US 12,372,979 B2
(45) Date of Patent: Jul. 29, 2025

(54) REMOTE CONTROL SYSTEM FOR A CONSTRUCTION MACHINE AND METHOD FOR CONTROLLING A CONSTRUCTION MACHINE

(71) Applicant: Schwing GmbH, Herne (DE)

(72) Inventors: Johannes Henikl, Dorsten (DE); Mykola Oleksyuk, Hattingen (DE)

(73) Assignee: Schwing GmbH, Herne (DE)

( * ) Notice: Subject to any disclaimer, the term of this patent is extended or adjusted under 35 U.S.C. 154(b) by 0 days.

(21) Appl. No.: 18/289,891

(22) PCT Filed: May 5, 2022

(86) PCT No.: PCT/EP2022/062133
§ 371 (c)(1),
(2) Date: Nov. 7, 2023

(87) PCT Pub. No.: WO2022/238228
PCT Pub. Date: Nov. 17, 2022

(65) Prior Publication Data
US 2024/0248485 A1    Jul. 25, 2024

(30) Foreign Application Priority Data

May 10, 2021   (DE) ...................... 10 2021 112 135.3

(51) Int. Cl.
*G05D 1/249*    (2024.01)
*E04G 21/04*    (2006.01)
(Continued)

(52) U.S. Cl.
CPC ............ *G05D 1/249* (2024.01); *G05D 1/223* (2024.01); *G05D 1/2435* (2024.01); *G05D 1/689* (2024.01);
(Continued)

(58) Field of Classification Search
CPC ...... G05D 1/249; G05D 1/689; G05D 1/2435; G05D 1/223; G05D 2109/20; G05D 2111/10; G05D 2105/05; E04G 21/0463
See application file for complete search history.

(56) References Cited

U.S. PATENT DOCUMENTS

2018/0247421 A1 * 8/2018 DeAngelis ........... H04N 23/695
2019/0284027 A1   9/2019 Albrecht

FOREIGN PATENT DOCUMENTS

DE    102014009165 A1    12/2015
DE    102016004250 A1    10/2017
(Continued)

OTHER PUBLICATIONS

International Search Report issued in PCT/EP2022/062133 dated Sep. 8, 2022 (English Translation).

*Primary Examiner* — Michael D Lang
(74) *Attorney, Agent, or Firm* — Faegre Drinker Biddle & Reath LLP

(57) ABSTRACT

A remote control system includes a mobile terminal configured to control a construction machine in a first operating mode using one or more control elements of the mobile terminal and to control at least one imaging device in a second operating mode using the one or more control elements of the mobile terminal. The at least one imaging device is controllable by the one or more control elements of the mobile terminal to record an environment of the construction machine and/or a working tool of the construction machine. A position and/or alignment of the at least one imaging device is controllable via the one or more control elements of the mobile terminal.

20 Claims, 9 Drawing Sheets

Figure 1:
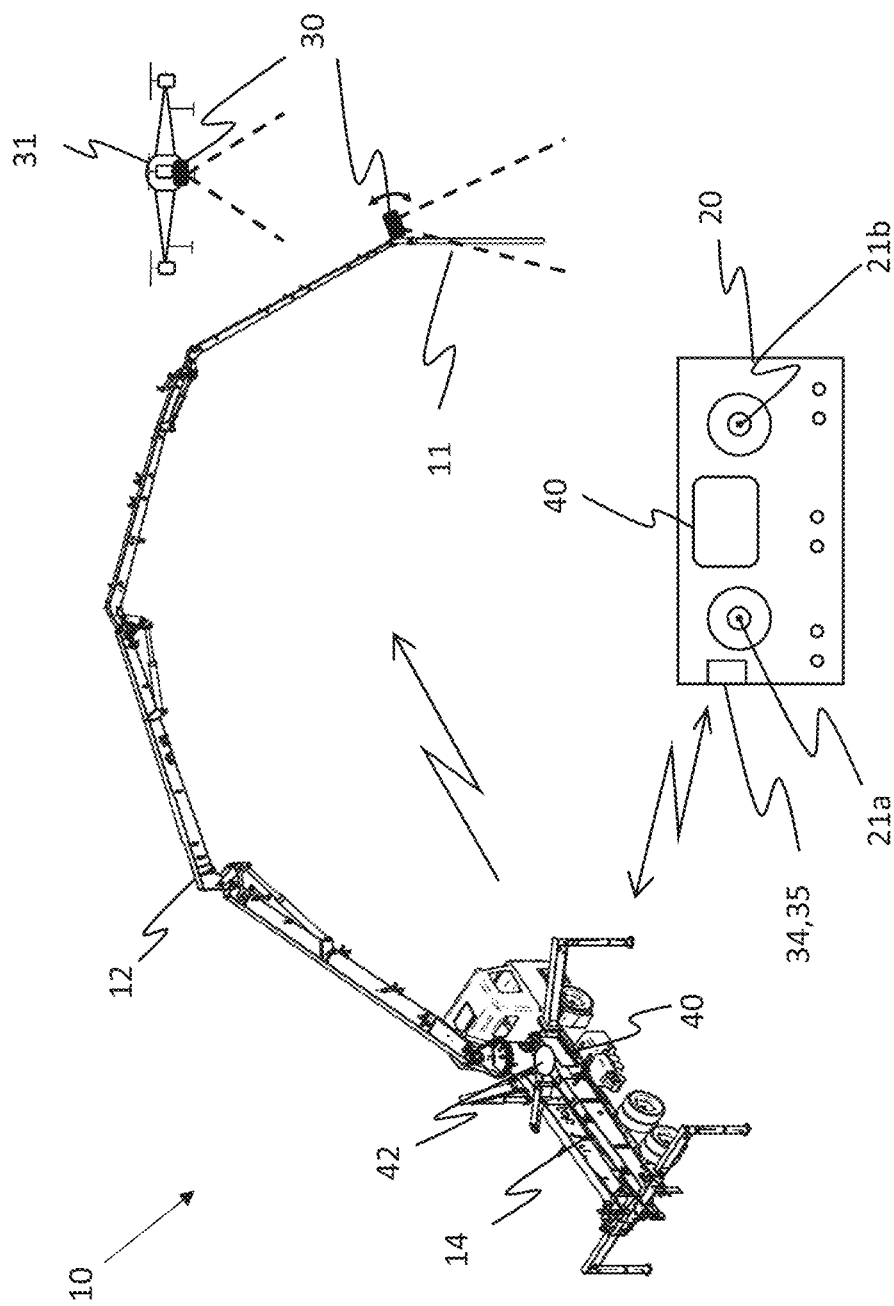

(51) Int. Cl.
    *G05D 1/223*     (2024.01)
    *G05D 1/243*     (2024.01)
    *G05D 1/689*     (2024.01)
    *G05D 105/05*     (2024.01)
    *G05D 109/20*     (2024.01)
    *G05D 111/10*     (2024.01)

(52) U.S. Cl.
    CPC ..... *E04G 21/0463* (2013.01); *G05D 2105/05* (2024.01); *G05D 2109/20* (2024.01); *G05D 2111/10* (2024.01)

(56) References Cited

FOREIGN PATENT DOCUMENTS

| | | |
|---|---|---|
| DE | 102016012786 A1 | 4/2018 |
| EP | 3408210 B1 | 10/2021 |
| WO | 2020122789 A1 | 6/2020 |

* cited by examiner

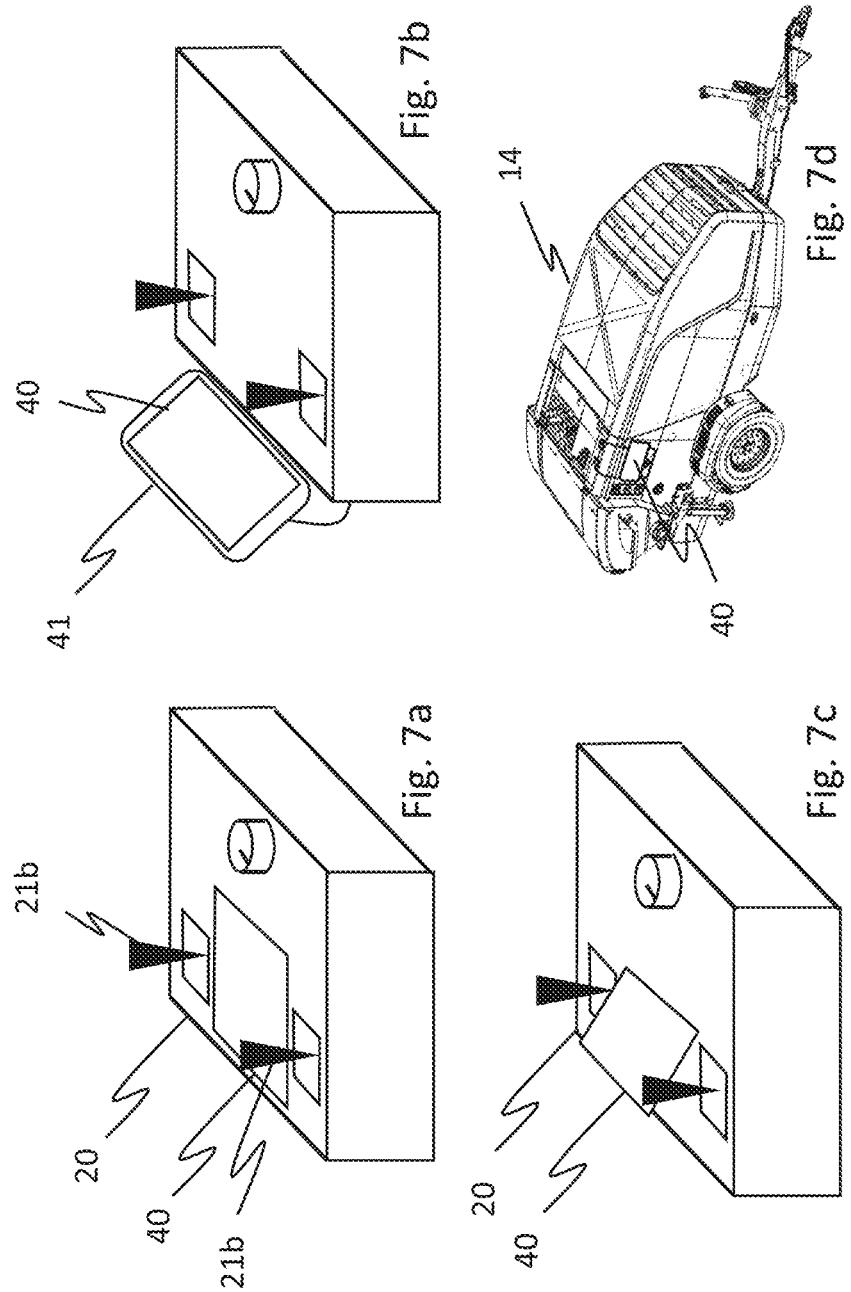

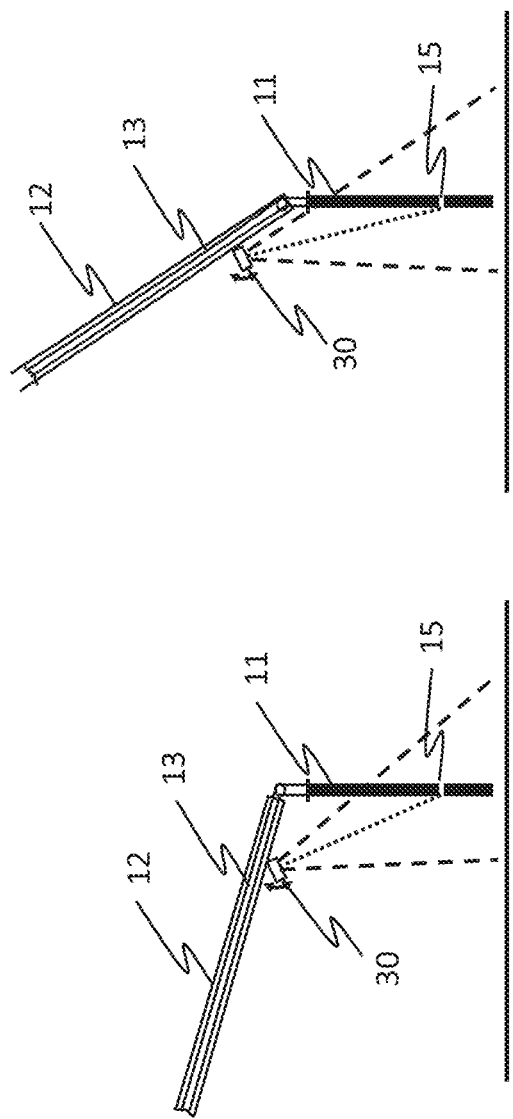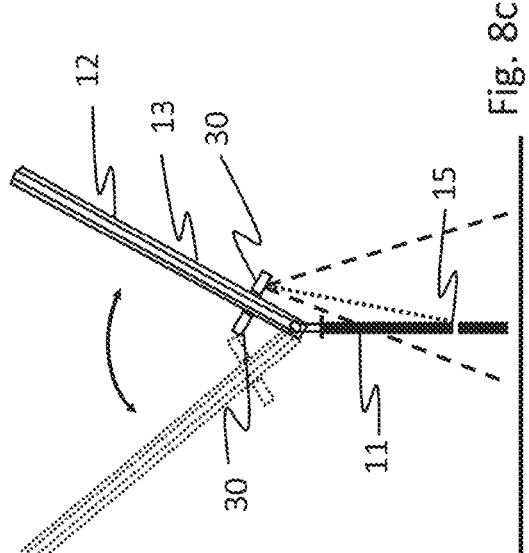

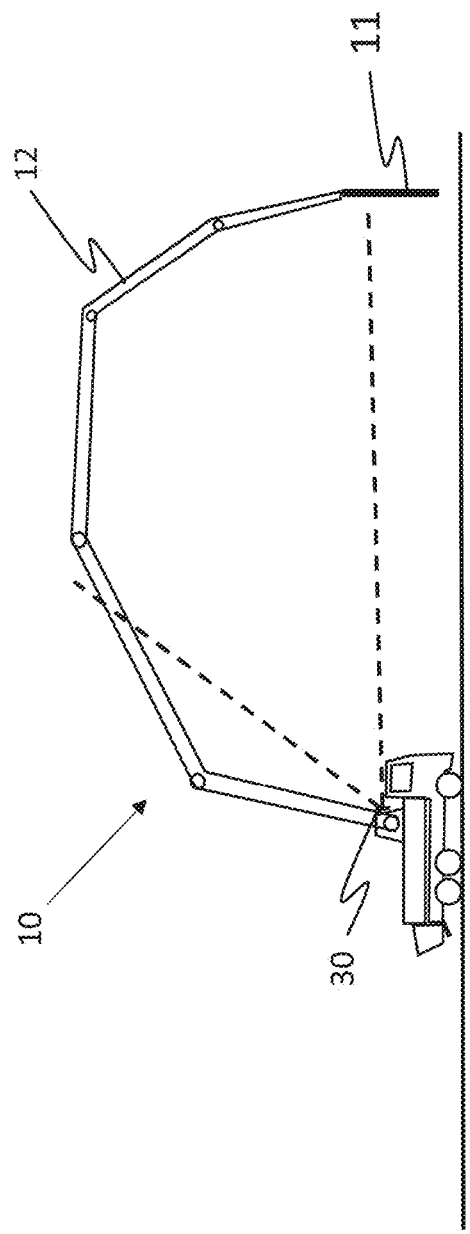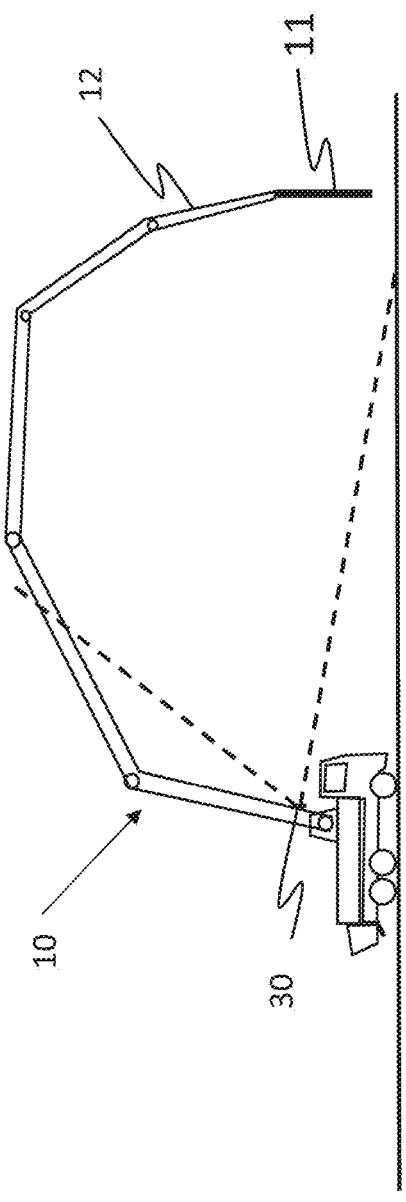

REMOTE CONTROL SYSTEM FOR A CONSTRUCTION MACHINE AND METHOD FOR CONTROLLING A CONSTRUCTION MACHINE

CROSS-REFERENCE TO RELATED APPLICATION

This application is a national stage application of International Application No. PCT/EP2022/062133, filed May 5, 2022, which claims priority to German Patent Application No. DE 10 2021 112 135.3, filed May 10, 2021, both of which are herein incorporated by reference in their entireties.

The invention relates to a remote control system for a construction machine with a mobile terminal with input and/or control elements for controlling the construction machine and at least one imaging device for recording the machine environment and/or a working tool of the construction machine, wherein the position and/or orientation of the at least one imaging device can be controlled.

The invention also relates to a method in which an operator controls a construction machine by means of input and/or control means, in particular joysticks, of a mobile terminal and recordings of the machine environment and/or of a working tool of the construction machine are provided by at least one controllable/alignable imaging device.

It is known from the prior art to control construction machines, for example cranes or truck-mounted concrete pumps, from an operator's station or with a remote control. In order to facilitate the operator's work, in particular if he cannot see all the working areas of the construction machine, it has already been proposed to provide imaging devices, for example cameras installed on the construction machine or in the working area of the construction machine or aerial drones equipped with cameras, in order to provide the operator with recordings, in particular video recordings, of the working equipment or the working environment, so that the operator can control the construction machine even if visual contact is limited or absent. The working equipment is, for example, the end hose at the end of the placing boom in the case of a truck-mounted concrete pump or the load hook in the case of a crane. The position or orientation of the cameras or drones can and should often be controlled by the operator, in particular in order to be able to view the working area optimally. However, the operator can be overwhelmed by this and, for example, neglect to control the construction machine while aligning a camera or confuse the control of the construction machine and the camera.

The present invention is therefore based on the object of providing an improved system and an improved method for controlling a construction machine that avoids the above-mentioned disadvantages of the prior art as far as possible.

This object is solved by a remote control system for a construction machine with the features of claim 1 as well as by a method for controlling a construction machine with the features of claim 14.

Advantageous embodiments and further developments of the invention are apparent from the dependent claims. It should be noted that the features listed individually in the claims can also be combined with one another in any desired and technologically useful manner and thus reveal further embodiments of the invention.

By using the input and/or control elements of the mobile terminal of the remote control system, which are used in a first operating mode to control the construction machine and in a second operating mode to control the at least one imaging device, the operator can very easily additionally use the control elements for controlling the construction machine, for example the joysticks used to control the placing boom of a truck-mounted concrete pump or the boom of a crane, to control/align the at least one imaging device. The operator therefore does not need to deal with two, possibly completely different, control elements or control devices for operating the construction machine and for controlling/aligning the imaging device, which could lead to operating errors and, for example in the case of a concrete placing boom, could have catastrophic consequences.

According to an advantageous embodiment, the at least one imaging device controlled/aligned by the mobile terminal is a camera arranged on the construction machine or a camera arranged outside the construction machine.

This enables the operator to obtain an optimum overview of the working environment of the construction machine.

An advantageous embodiment provides that the at least one imaging device controlled/aligned by the mobile terminal is an aerial drone equipped with a camera and, in the second operating mode, the aerial drone and/or the camera can be controlled with the input and/or control elements. Thus, for example, the operator can very easily position an aerial drone equipped with a camera in the working area of the construction machine and align the camera.

In accordance with an advantageous embodiment, the input and/or control elements of the mobile terminal comprise a first and a second joystick and, in the second operating mode, the construction machine can be controlled with the first joystick and the at least one imaging device can be controlled with the second joystick. The operator can then use a mobile terminal to simultaneously control the construction machine, for example the placing boom of a truck-mounted concrete pump, and a camera or an aerial drone with a camera, and thus view the situation at the end hose of the placing boom with optimal alignment of the camera while controlling the construction machine.

The input and/or control elements of the mobile terminal can advantageously also comprise a first and a second joystick, wherein the aerial drone can be controlled with the first joystick and the camera on the aerial drone can be controlled with the second joystick. This allows the operator to use one joystick to direct the aerial drone to an optimal position while simultaneously using the other joystick to align the camera's viewing angle with, for example, the work equipment.

The recordings of the at least one imaging device are advantageously transmitted to the mobile terminal and the mobile terminal has a display for displaying the recordings. Thus, on the one hand, the operator can easily control the construction machine and the at least one imaging device with the mobile terminal and, at the same time, has a display of the working environment or the working tool of the construction machine on the display, which he might not otherwise be able to view directly.

According to an advantageous embodiment of the invention, the recordings of the at least one imaging device are transmitted to a smartphone or tablet computer or augmented reality glasses or virtual reality glasses for display.

According to a further embodiment of the invention, the recordings of the at least one imaging device can be transmitted to a display arranged on or in the construction machine and displayed thereon. This enables the machine operator to conveniently simultaneously follow the work process on the work equipment while controlling the construction machine on the display, which can also be arranged in the operator's cab of the construction machine, for example.

The remote control system can advantageously comprise at least two imaging devices for recording the machine environment and/or a working tool of the construction machine and an image processing unit, wherein the image processing unit combines the recordings of the at least two imaging devices to form a virtual 3D image. This provides the operator with a better overview of the work process at the work equipment. In addition, the operator can advantageously set any perspective on the machine environment and/or the working tool of the construction machine on a display using the virtual 3D image.

Preferably, it is provided that the remote control system comprises an evaluation unit for automatically evaluating the recordings of the at least one imaging device. This means that the evaluation unit can automatically evaluate the recordings made by the camera or cameras and thus support the operator in his work.

Advantageously, the evaluation unit evaluates the recordings in such a way that collision objects are detected. This measure allows to avoid collisions of components/work equipment automatically by the remote control system by automatically stopping movements of the construction machine or, for example, the aerial drone, initiated by the operator, if collisions are expected due to an initiated movement.

Alternatively or additionally, the evaluation unit can evaluate the recordings in such a way that the at least one imaging device is automatically aligned with a working tool of the construction machine. This measure allows the operator to concentrate on controlling the construction machine, for example, while the working area around the working tool is always shown to him on a display.

In addition, the evaluation unit can evaluate the recordings in such a way, for example, that an aerial drone as an imaging device can fly automatically to the landing site. This feature also allows the operator to concentrate on controlling the construction machine while the aerial drone automatically flies to its landing site, for example on the construction machine, in order to recharge the batteries, for example.

It is particularly advantageous if the system comprises at least a second aerial drone as imaging device, which automatically takes over the task of recording the machine environment and/or a working tool of the construction machine from the first drone when the battery of the first drone needs to be charged.

Figure 2:
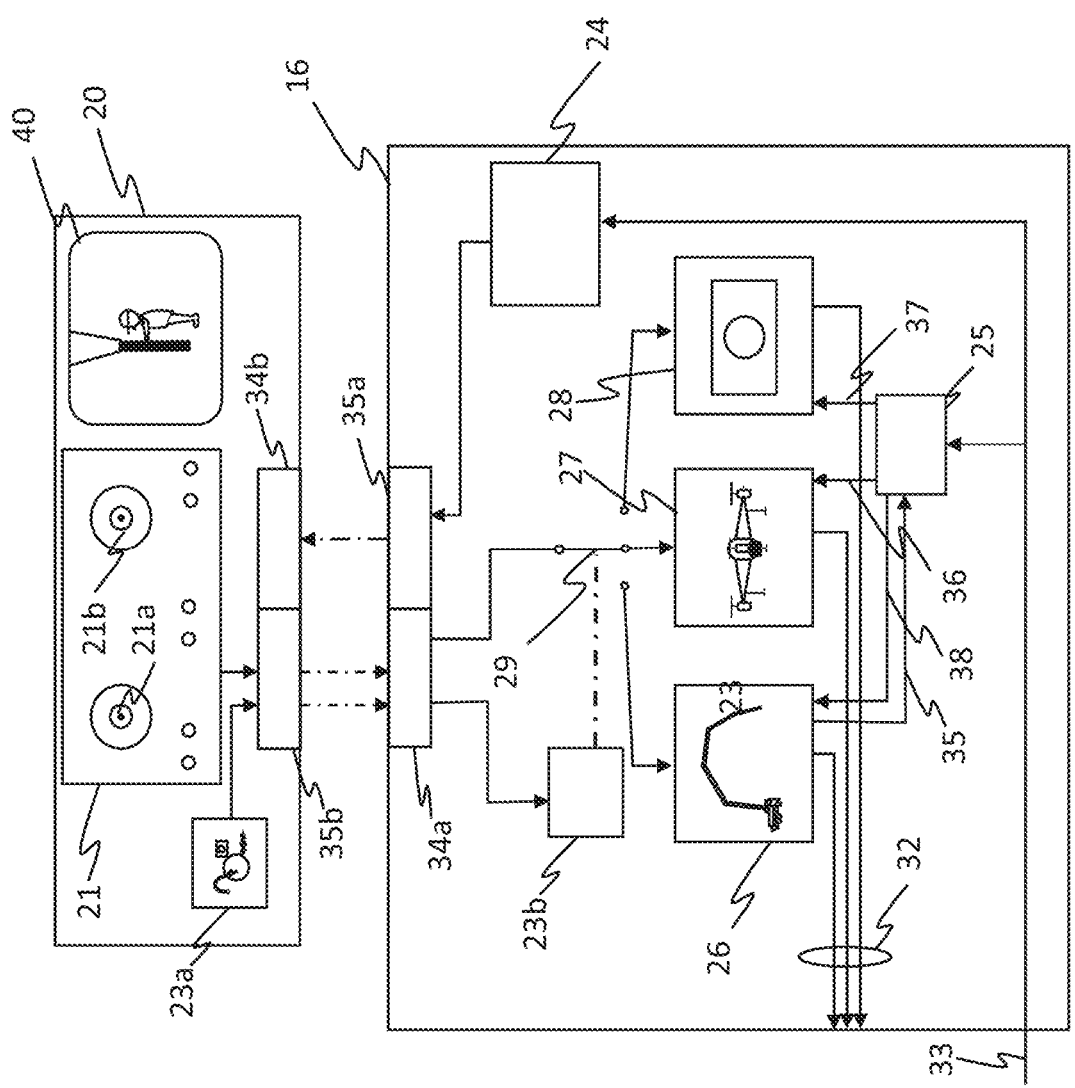
Figure 3:
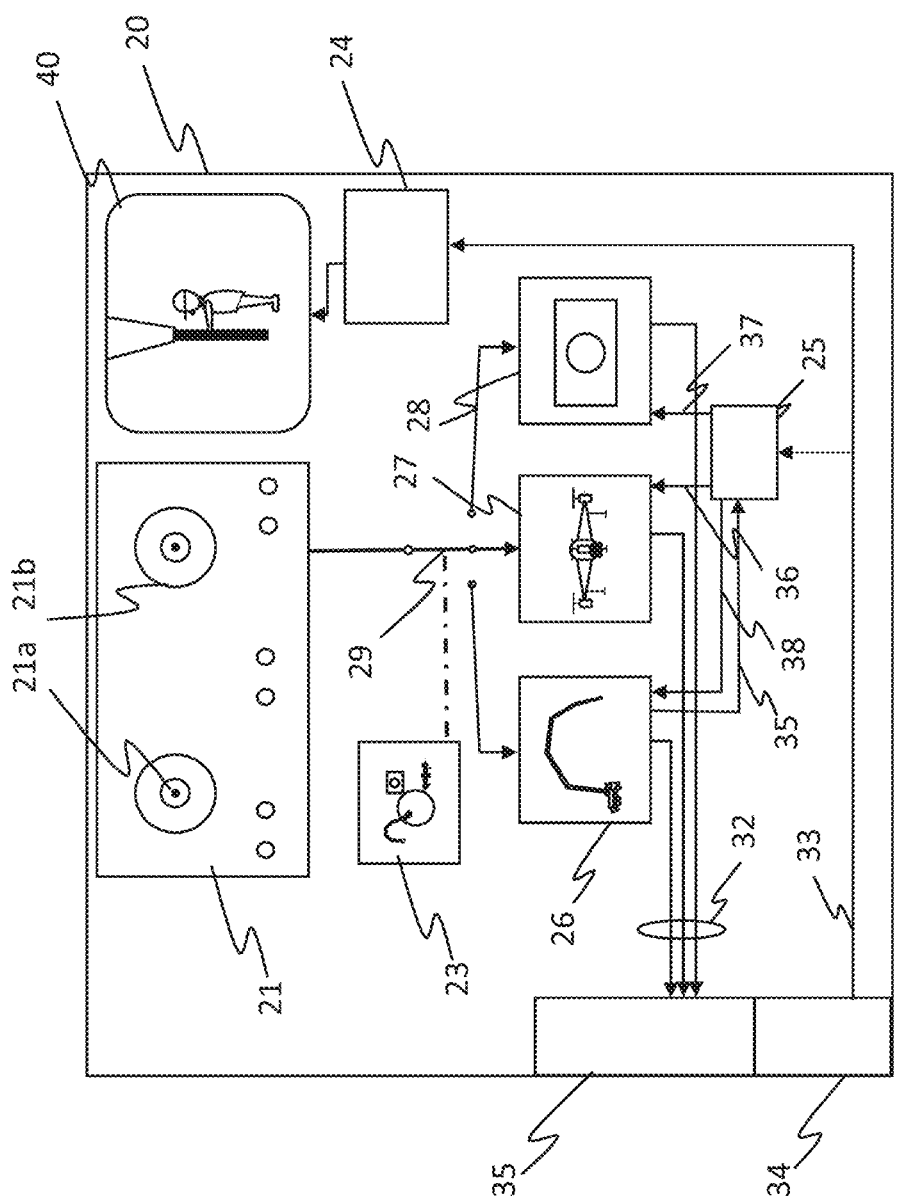
Figure 4:
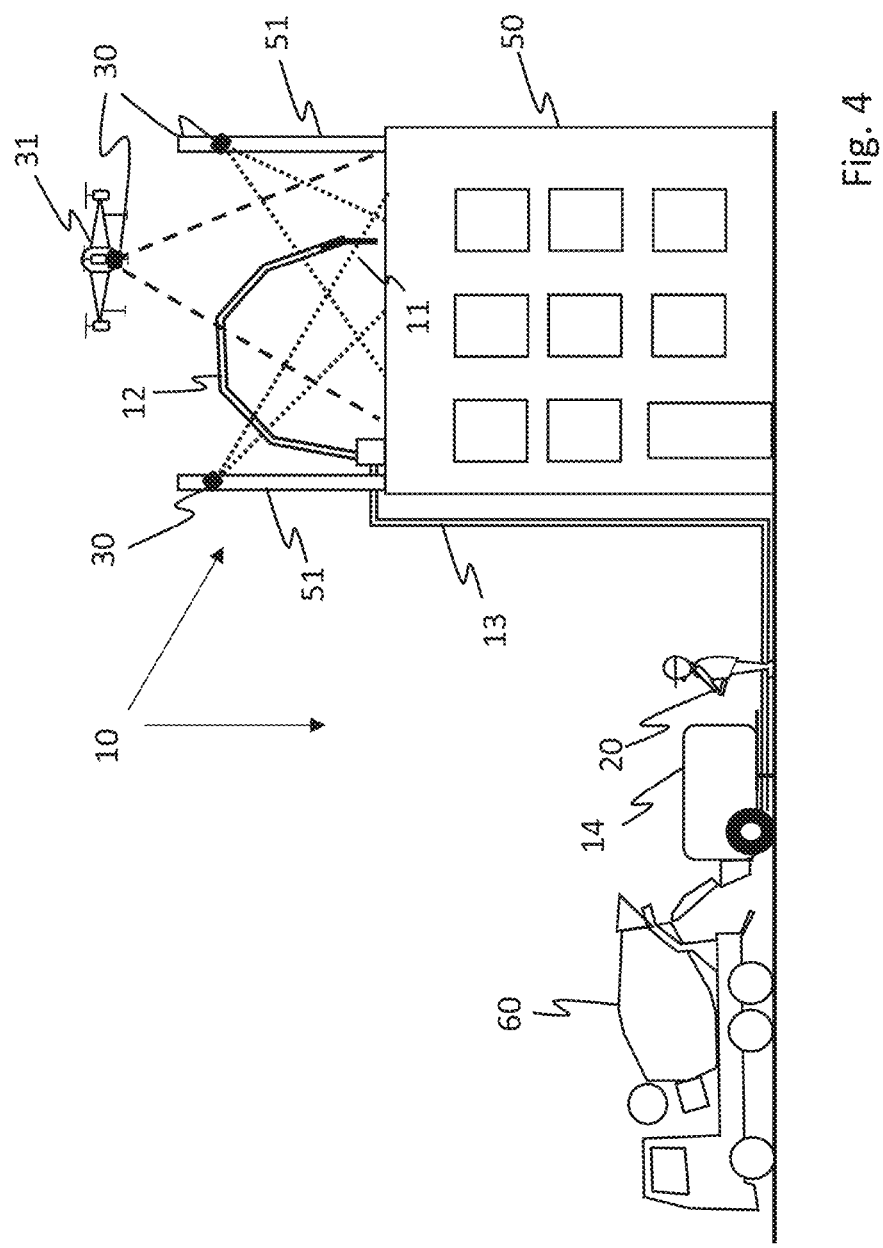
Figure 5:
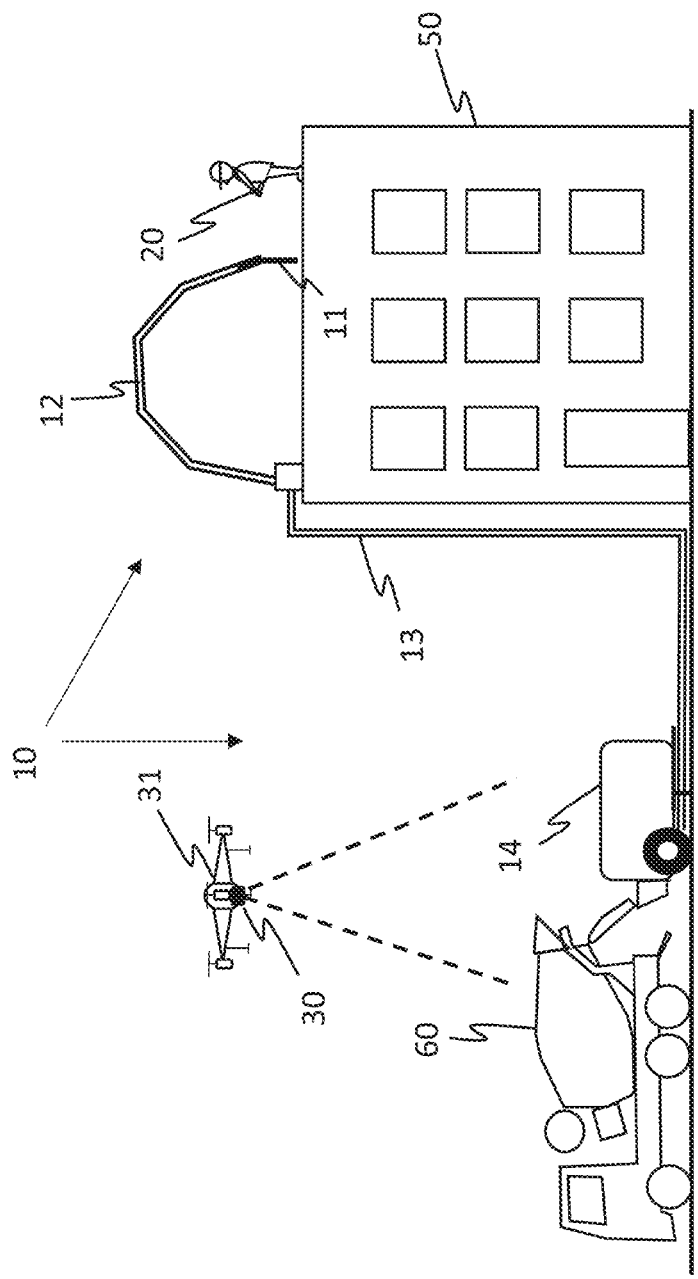

Further features, details and advantages of the invention will be apparent from the following description and from the drawings, which show examples of embodiments of the invention. Corresponding objects or elements are provided with the same reference signs in all figures:

FIG. 1 Illustration of the remote control system according to the invention in a construction site environment FIG. 2 Remote control system according to the invention in a first embodiment FIG. 3 Remote control system according to the invention in a second embodiment FIG. 4 Schematic representation of a further construction site environment of a construction machine in which the remote control system according to the invention is used FIG. 5 Variant of the schematic representation of FIG. 4

Figure 6:
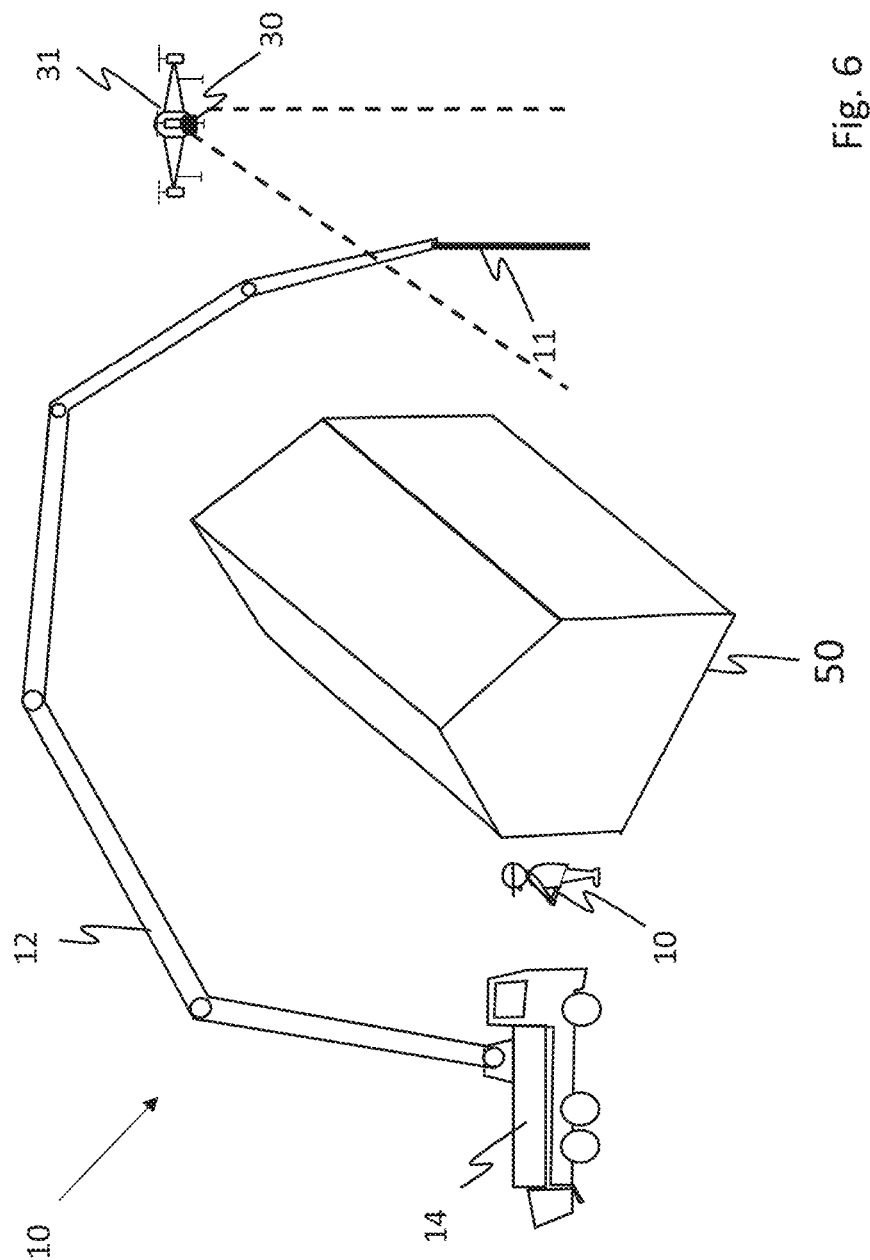

FIG. 6 Schematic representation of a further working environment of a construction machine where the remote control system according to the invention is used FIGS. 7*a-d* Schematic representation of various display devices of the remote control system according to the invention FIGS. 8*a, b, c* Schematic representation of an automatic camera alignment according to the invention FIGS. 9*a, b* Schematic representation of a further camera alignment according to the invention FIG. 1 shows a remote control system according to the invention, which is used to control a construction machine 10 in the form of a truck-mounted concrete pump 10 arranged on a truck chassis. The truck-mounted concrete pump 10 is equipped with a placing boom 12, at the end of which a working device 11 in the form of an end hose 11 hangs down. The truck-mounted concrete pump 10 has a concrete pump 14 with which fresh concrete delivered by a truck mixer is pumped via a conveying pipe which is not shown in FIG. 1, to the end hose 11 and from there placed on the construction site. Furthermore, FIG. 1 shows a mobile terminal 20 with input and/or control elements 21, in particular in the form of joysticks 21*a*, 21*b* (FIG. 2), for inputting control commands for controlling the truck-mounted concrete pump 10, respectively the placing boom 12 and the concrete pump 14 in a first operating mode. For example, the joysticks 21*a* and 21*b* may be deflectable in the X- and Y-axes and rotatable for control in the Z axis. Furthermore, pressing down the joysticks or buttons on a joystick 21*a* and 21*b* can trigger further functions, for example, recording a photograph to document the concreting process.

FIG. 1 also shows an imaging device in the form of a camera 30 at the end of the placing boom 12, above the end hose 11 for recording the end hose 11 and the immediate environment, or the place of placement of the fresh concrete, and an imaging device in the form of an aerial drone 31, on which a further camera 30 is arranged. In a second operating mode, the camera 30, respectively the aerial drone 31, is controllable with the input and/or control elements 21, in particular the joysticks 21*a* and 21*b*, of the mobile terminal 20. Even though the aerial drone 31 itself cannot take any recordings, but always only in conjunction with the camera 30 arranged on the aerial drone 31, for the sake of simplicity the aerial drone 31 is referred to as an imaging device because the recording perspective of the camera 30 on the aerial drone 31 is also changed by controlling the aerial drone 31. In the following, the invention will be described with reference to a camera 30 and an aerial drone 31, respectively. It is understood that several cameras 30 or several aerial drones 31, each of which may also be equipped with several cameras 30, can also be controlled by the remote control system according to the invention.

In the case where both joysticks 21*a*, 21*b* are used for controlling an aerial drone 31 equipped with a camera 30, the control functions of the joysticks 21*a*, 21*b* could be allocated as follows, for example:

Joystick 21*a* (Left):
    x-axis: aerial drone 31: rotate around the vertical axis
    y-axis: camera 30 at the aerial drone 31: Viewing angle up/down
    z-axis: camera 30 at the aerial drone 31: Zoom Joystick 21*b* (Right):
    x-axis: aerial drone 31: movement left/right
    y-axis: aerial drone 31: movement forward/backward
    z-axis: aerial drone 31: movement up/down FIG. 2 shows a mobile terminal 20 of a remote control system according to the invention and a control unit 16 of a construction machine. The mobile terminal 20 corresponds essentially to a (radio) remote control system common today with input and or control elements 21, in particular in the form of joysticks 21a and 21b for remote control of a construction machine 10, for example for remote control of the concrete pump 14 and the placing boom 12 of a truck-mounted concrete pump 10. The mobile terminal device 20 comprises, for example, a display device 40 for displaying the recording of an imaging device 30, 31. By means of a changeover switch 23a, which is shown here as a rotary switch but can also be operated, for example, via a touch screen or voice control, the remote control system is switched from a first operating mode, in which only the truck-mounted concrete pump 10 is controlled by the input and/or control elements 21, to a second operating mode, in which the at least one imaging device 30, 31 can additionally be controlled by the input and/or control elements 21 of the mobile terminal 20. The mobile terminal 20 further comprises a radio receiver 34b and a radio transmitter 35b for exchanging data with the control unit 16 of the truck-mounted concrete pump 10. The control unit 16 comprises a corresponding radio receiver 34a and a radio transmitter 35a for exchanging data with the mobile terminal 20. The data between the mobile terminal 20 and the control unit 16 can also be transmitted via a cable connection. The setting of the changeover switch 23a made by the operator is passed to the changeover switch 23b of the control unit 16, which selects, for example by means of a switch 29, whether the construction machine control module 26, the aerial drone control module 27 or camera control module 28 are assigned to the input and or control elements 21. The illustration greatly simplified in FIG. 2, because the switch 23a in conjunction with the switch 23b can also be used, for example, to assign only the joystick 21a to the construction machine control module 26 for the construction machine 10, and the second joystick 21b is assigned to the aerial drone control module 27 for controlling the aerial drone 31 or to the camera control module 28 for controlling the camera 30. All settings in which one or more imaging devices 30, 31 or the one or more imaging devices 30, 31 and at the same time the truck-mounted concrete pump 10 are controlled, are to be understood as a second operating mode in the sense of the invention, whereas in the first operating mode only the truck-mounted concrete pump 10 is controlled by the input and or control elements 21. The control modules 26, 27, 28 adequately control the truck-mounted concrete pump 10, the camera 30 and the aerial drone 31 via control signal lines 32 by cable or by radio. The recordings of the imaging devices 30, 31, or of the cameras 30, are transmitted to the control unit 16 by radio or by cable via the image signal line 33 and can either be forwarded directly to the display device 40 of the mobile terminal 20 or first pass through the image processing unit 24, which, for example, processes recordings of a plurality of cameras 30 to form a three-dimensional image, of which an adjustable two-dimensional projection is then displayed on the display device 40. The image processing unit 24 may also, for example, receive recordings from a plurality of cameras 30 and pass only the recording from one camera 30, which has been adequately selected by the user on the mobile terminal 20, to the display device 40. The recordings can also be routed from the image signal line 33 to an evaluation unit 25, which evaluates the recordings in order, for example, to examine the environment of the aerial drone 31 or the placing boom 12 for possible collision hazards. Upon detection of a collision hazard, the evaluation unit 25 can, for example, trigger an alarm tone or, for example, influence the control module 26 or 27 via the control lines 36 and/or 38 in order to, for example, prevent or change a movement of the placing boom 12 or influence the position of the aerial drone 31. The evaluation unit 25 could also, for example, detect a mark 15 (FIGS. 8a, 8b) on the end hose in the recordings and autonomously control or reposition the camera 30 or aerial drone 31 via the control line 37 or control line 38, respectively. The autonomous control of the camera 30 or the aerial drone 31 can be performed via the control modules 27, 28. However, the camera 30 or the aerial drone 31 may also be equipped for autonomous control via integrated control modules. The evaluation device 25 can, for example, also receive control data from the truck-mounted concrete pump 10 via the control line 35, in particular for controlling the placing boom 12, and then have a regulating effect on the control modules 27 and 28 in order to automatically track the position of the aerial drone 31, or camera 30. The recordings can also be evaluated in such a way that the position of the aerial drone 31, and thus the orientation of the camera 30, is automatically changed if the end hose 11 is no longer fully visible, for example because people are in the area of the end hose 11.

FIG. 3 shows an alternative embodiment of a mobile terminal 20 with which both, the truck-mounted concrete pump 10 and the camera 30 or aerial drone 31, can be controlled, as already described in connection with FIG. 2. The mobile terminal 20 shown in FIG. 3 has more computing power than the mobile terminal 20 shown in FIG. 2 and includes the control modules 26, 27 and 28, as well as the evaluation unit 25 and the image processing unit 24, which thus no longer need to be present in the control unit 16 of the truck-mounted concrete pump 10. The functionality of these modules and units is practically identical to that described in connection with the functionalities shown in FIG. 2. It is understood that other divisions of the units and modules between the mobile terminal 20 and the control unit 16 of the truck-mounted concrete pump 10 are possible. The control of the imaging devices 30 and 31 and the reception of the recordings also do not always have to be carried out via the control unit 16 of the truck-mounted concrete pump 10, but with adequate means, not shown, the mobile terminal 20 can also communicate directly with the imaging devices 30, 31.

For example, the aerial drone 31 may be equipped with a positioning system that is fixed to the construction site, such as a radio positioning system or GPS, so that it automatically maintains its position after a control operation or repositioning until the next control operation.

When controlling a placing boom 12 of a truck-mounted concrete pump 10, the movements of the individual joints of the placing boom 12 are usually controlled with the two joysticks 21a and 21b. However, it is also possible to control the individual joints of the placing boom 12 with only one joystick 21a, whereby the operator only specifies the direction of the end hose 11 (forward/backward; up/down) at the one joystick 21a and the control module 26 performs the control of the individual boom joints of the placing boom 12 (so-called single-lever control). For example, if the placing boom 12 is controlled only by the left joystick 21a, the right joystick 21b can be used to control the camera 30 or the aerial drone 31 in the second operating mode. It is also conceivable that in the second operating mode individual axes of the joysticks 21a, 21b are divided between the control of the construction machine 10 and the control of the imaging devices 30,31. In this way, the operator can easily control the construction machine 10 and an imaging device 30, 31 simultaneously.

In the case where both joysticks 21a, 21b are used for controlling an aerial drone 31 equipped with a camera 30, the functions of the joysticks 21a, 21b could be allocated as follows, for example:

Joystick 21a (Left):
x-axis: aerial drone 31: rotate around vertical axis
y-axis: camera 30 at the aerial drone 31: viewing angle up/down
z-axis: camera 30 at the aerial drone 31: zoom Joystick 21b (Right):
x-axis: aerial drone 31: movement left/right
y-axis: aerial drone 31: movement forward/backward
z-axis: aerial drone 31: movement up/down For example, if the joysticks 21a and 21b are used in the second mode of operation to control both the truck-mounted concrete pump 10 and the imaging devices 30, 31, the allocation could be as follows:

Left Joystick:
x-axis: aerial drone 31: Circular path around the end hose
y-axis: construction machine 10/one-lever control: adjusting the inclination of the boom tip
z-axis: camera 30: zoom Right Joystick
x-axis: construction machine 10: rotate placing boom 12
y-axis: construction machine 10: end hose 11 forward/backward
z-axis: construction machine 10: end hose 11 up/down For example, the aerial drone 31 changes its perspective on the end hose 11 as it orbits around the end hose 11, and the aerial drone 31, or rather the camera 10 attached to it, automatically remains aligned with the end hose 11.

In this case, the aerial drone 31 autonomously controls a portion of its degrees of freedom, for example, by means of a built-in gyrometer, GPS, environmental monitoring, or the like.

FIG. 4 shows an exemplary construction site scenario in which the remote control system according to the invention is used. In this case, the construction machine 10 consists of a so-called stationary or trailer concrete pump 14 with a conveying line 13 and a placing boom 12 arranged on a building 50 for distributing the fresh concrete by means of an end hose 11. The fresh concrete is transferred from a truck mixer 60 into the feed hopper of the stationary pump 14. Because one operator cannot simultaneously observe the stationary pump 14, in particular the concrete transfer process from the truck mixer 60 into the pump 14, and the placing boom 12, two operators have generally been required for such construction sites to observe the processes and communicate with each other, for example, via a two-way radio. In the scenario according to the invention, one operator is sufficient who, as shown in FIG. 3, is in the area of the stationary pump 14 and controls the concreting process with the remote control system according to the invention. On the building 50, for example, a camera 30 is installed on a wall or a support post 51 at a height of a few meters and is aligned with the concreting area. The camera 30 can be controlled with servomotors to control its orientation by the operator from the mobile terminal 20 using one of the joysticks 21a, 21b in the second mode of operation. In addition, the operator can also zoom the camera 30 in and out, for example. By means of a second camera 30 arranged on the other side of the placing boom 12 or next to the first camera 30, the camera images can be combined for a 3D visualization or spatial image, respectively. Alternatively or additionally, a aerial drone 31 with a camera 30 can be positioned above the concreting area, which is also controlled by the operator using the remote control system according to the invention. If, due to constructional conditions, the aerial drone 31 cannot be positioned so that the end hose 11 is clearly visible, with the camera 30 oriented vertically downwards, the aerial drone 31 can also be positioned to the side of the placing boom 12 and the camera 30 is oriented in a way that the operator has a good view of the concreting area. In addition to the image transmission, one or more microphones may also be positioned in the concreting area so that workers in the concreting area can provide instructions to the operator. Conversely, the imaging device 30, 31 may also be equipped with a loudspeaker for outputting instructions to workers at the end hose 11.

FIG. 5 shows a similar construction site scenario in which the operator with the mobile terminal 20 stands on the building 50 with direct visual contact to the placing boom 12 and controls it. An aerial drone 31 with a camera 30 is positioned above the stationary pump 14, or the truck mixer 60, which allows the operator to observe the concrete pouring process on a display device 40 (FIGS. 7a-d). When the feed hopper of the stationary pump 14 is sufficiently filled by the truck mixer 60, the operator can increase the pumping rate of the stationary pump 14 via the mobile terminal 20, but also reduce or stop it if no or little fresh concrete is delivered by the truck mixer 60.

FIG. 6 shows a similar construction site scenario as in FIG. 3, in which a building 50 is located between a truck-mounted concrete pump 10 and the concreting area. For this purpose, the placing boom 12 is guided over the building 50 so that the operator standing in the area of the truck-mounted concrete pump 10 cannot see the concreting area. An aerial drone 31 with a camera 30 is positioned in the area of the end hose 11 and sends recordings to the mobile terminal 20, with which the operator controls both, the truck-mounted concrete pump 10 with the placing boom 12 and the aerial drone 31 with the camera 30, in the second operating mode.

FIGS. 7a-c show possible variants for arranging the display device 40. FIG. 7a shows a display device 40 fixedly arranged in the mobile terminal 20 as described in connection with FIGS. 1, 2 and 3. FIG. 7b shows a smartphone or tablet computer 41 with a display device 40, which is attached to the mobile terminal 20, for example, by means of a suitable recording device. The recordings of the camera 30 can, for example, also be sent directly to the smartphone 31, for example via a WLAN radio connection, or are transmitted in a suitable manner from the mobile terminal device 20 to the smartphone 41 via a radio or cable connection. A further display device may also be arranged on the mobile terminal 20, on which the machine data and the control menu are displayed, as has been customary in the past. FIG. 7c shows a variant of FIG. 7a, in which the display device 40 is arranged movably on the mobile terminal 20. In FIG. 7d, the display device 40 is arranged on a stationary pump 14 so that it is clearly visible to the operator. The display device 40 can, for example, also be arranged on a truck-mounted concrete pump 10, or in the drivers cab of the truck-mounted concrete pump 10, so that the operator can conveniently control all processes from the driver's cab. Likewise, it is conceivable that an operator could use the remote control system presented herein to control both the truck-mounted concrete pump 10 and the imaging devices 30, 31 from a more remote location or from a construction container. Additionally or alternatively, the display device 40 could also be part of augmented reality goggles, not shown, which superimpose the camera image onto the operator's normal field of view. Furthermore, the display device 40 could also be part of virtual reality goggles, which may also provide the operator with a wider-angle perspective of the concreting field.

The aerial drone 31 can also be equipped, for example, with a radar, lidar or similar system for avoiding its own collisions or collisions of, for example, the observed placing boom 12 and thus autonomously correct its own position or influence the position or movement of the placing boom 11 via the evaluation unit 25.

FIGS. 8*a*, 8*b* and 8*c* show, as already explained above, how a camera 30 attached to the top of the placing boom 12 can be automatically aligned with the aid of object recognition, for example by means of the evaluation unit 25. For example, a mark 15 is attached to the end hose 11, which is detected by the evaluation unit 25. The evaluation unit 25 then acts on the control module 28 for the camera 10 when the inclination of the last boom segment of the placing boom 12 is changed, so that the marker 15 is always displayed in the center of the image or a position selected by the user. Alternatively, the orientation of the camera 30 could automatically follow a boom movement, that is, if the operator changes the tilt of the last boom segment, the tilt of the camera 10 is automatically readjusted in the opposite direction. In FIG. 8*c*, two cameras 30 are arranged at the top of the placing boom so that a second camera 30 can take over image transmission when the inclination of the last boom segment exceeds 90 degrees.

FIGS. 9*a* and 9*b* show exemplary two possibilities of mounting the camera 30 on the rotating turret of the placing boom 12, respectively on the first boom segment of the placing boom 12. From this perspective, the operator can view the entire position of the placing boom 12 and, for example, also the folding and unfolding process of the placing boom 12 and, if necessary, control it without line of sight to the placing boom 12. In particular, when the camera 30 is located on the first segment of the placing boom 12, the orientation of the camera 30 can also follow the boom movements so that the area around the end hose 11 is always clearly visible on the images.

The camera 30 may, for example, be equipped with a wide-angle or fisheye lens. For better interpretability of the images, it is advantageous to rectify the images with the aid of the image processing unit 24 before they are displayed on the display device 40.

The imaging devices 30, 31 could also check the working environment for possible obstacles before the placing boom 12 is unfolded, which are then automatically taken into account when the placing boom 12 is unfolded.

Because aerial drones have limited battery capacity, it is advantageous to display the battery charge level on the display device 40, for example. By using two aerial drones 31, camera monitoring can also be maintained over a longer period of time, with the aerial drones 31 operating alternately and flying to a charging station at the landing site 42. Once one freshly charged aerial drone 31 has begun monitoring the work area, the other aerial drone 31 can approach the landing site 42 with the charging station. A marker at the landing site for image processing may facilitate the autonomous approach. Alternatively or additionally, the landing site 42 and the aerial drone 31 are equipped with GPS sensors to facilitate the approach. Charging of the aerial drone 31 is performed using, for example, contactless charging technology (for example, inductive, resonant, or inductive) to avoid connecting a charging plug to the aerial drone 31.

LIST OF REFERENCE SIGNS

10 Construction machine/truck mounted concrete pump
11 Working tool/end hose
12 Placing boom
13 Conveying pipe
14 Concrete pump/stationary pump
15 Marking
16 Control unit
20 Mobile terminal
21 input and/or control elements
23 changeover switch
24 image processing unit
25 Evaluation unit
26 Control module construction machine
27 Control module aerial drone
28 Control module camera
30 camera
31 aerial drone
32 control signal line
33 image signal line
34 a, b radio receiver
35 a, b radio transmitter
36 control line
37 control line
38 control line
40 display device
41 Smartphone/tablet
42 Landing site
50 building
51 wall/support post
60 truck mixer

The invention claimed is:

1. A remote control system comprising:
a mobile terminal configured to control a construction machine in a first operating mode using one or more control elements of the mobile terminal and to control at least one imaging device in a second operating mode using the one or more control elements of the mobile terminal,
wherein the at least one imaging device is controllable by the one or more control elements of the mobile terminal to record an environment of the construction machine and/or a working tool of the construction machine,
wherein a position and/or alignment of the at least one imaging device is controllable via the one or more control elements of the mobile terminal,
wherein the one or more control elements of the mobile terminal are joysticks deflectable in an X-axis and a Y-axis,
wherein the joysticks are configured to control both the construction machine and the at least one imaging device.

2. The remote control system of claim 1, further comprising:
the at least one imaging device, wherein the at least one imaging device is a camera positioned on the construction machine or outside the construction machine.

3. The remote control system of claim 1, further comprising:
the at least one imaging device, wherein the at least one imaging device is an aerial drone equipped with a camera,
wherein, in the second operating mode, the aerial drone and/or the camera are controllable with the one or more control elements of the mobile terminal.

4. The remote control system of claim 3, wherein the joysticks comprise a first joystick and a second joystick, wherein, in the second operating mode, the aerial drone is controllable with the first joystick and the camera is controllable with the second joystick.

5. The remote control system of claim 1, wherein the joysticks comprise a first joystick and a second joystick, wherein, in the second operating mode, the construction machine is controllable with the first joystick and the at least one imaging device is controllable with the second joystick.

6. The remote control system of claim 1, wherein the mobile terminal comprises a display, wherein the mobile device is configured to receive recordings of the at least one imaging device and display the recordings.

7. The remote control system of claim 6, wherein the recordings are transmittable to a smartphone, tablet computer, augmented-reality glasses, or virtual-reality glasses for visualization.

8. The remote control system of claim 6, wherein the recordings are transmittable to and displayable on a display device arranged on or in the construction machine.

9. The remote control system of claim 1, further comprising:
the at least one imaging device, wherein the at least one imaging device comprises at least two imaging devices for recording the environment and/or the working tool and an image processing unit,
wherein the image processing unit is configured to combine recordings of the at least two imaging devices into a three-dimensional image.

10. The remote control system of claim 1, wherein the remote control system comprises an evaluation unit for automatic evaluation of recordings of the at least one imaging device.

11. The remote control system of claim 10, wherein the evaluation unit is configured to evaluate the recordings such that collision objects are recognized.

12. The remote control system of claim 10, wherein the evaluation unit is configured to evaluate the recordings such that the at least one imaging device can be automatically aligned with the working tool.

13. The remote control system of claim 10, further comprising:
the at least one imaging device, wherein the at least one imaging device comprises a camera on an aerial drone, wherein the evaluation unit is configured to evaluate the recordings such that the aerial drone can fly automatically to a landing site.

14. The remote control system of claim 1, wherein the joysticks are rotatable in a Z-axis.

15. The remote control system of claim 14, wherein the joysticks are configured to be pressed down.

16. A method for controlling both a construction machine and one or more imaging devices using a single mobile terminal, the method comprising:
controlling, in a first operating mode, the construction machine using one or more control elements of the single mobile terminal;
controlling, in a second operating mode, a position and/or an alignment of the one or more imaging devices using the one or more control elements of the single mobile terminal; and
displaying, using a display on the single mobile terminal, recordings of an environment of the construction machine and/or of a working tool of the construction machine,
wherein the one or more control elements of the mobile terminal are joysticks deflectable in an X-axis and a Y-axis,
wherein the joysticks are configured to control both the construction machine and the at least one imaging device.

17. The method of claim 16, wherein the joysticks comprise a first joystick and a second joystick.

18. The method of claim 17, wherein, in the second operating mode, the construction machine is controllable with the first joystick and the at least one imaging device is controllable with the second joystick.

19. The method of claim 16, wherein the joysticks are rotatable in a Z-axis.

20. The method of claim 19, wherein the joysticks are configured to be pressed down.

\* \* \* \* \*